(12) United States Patent
Maki

(10) Patent No.: US 12,423,205 B2
(45) Date of Patent: Sep. 23, 2025

(54) MONITORING SYSTEM, MONITORING METHOD AND SERVER USED THEREFOR

(71) Applicant: SHIMADZU CORPORATION, Kyoto (JP)

(72) Inventor: Shota Maki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 14 days.

(21) Appl. No.: 18/196,445

(22) Filed: May 12, 2023

(65) Prior Publication Data

US 2023/0367686 A1 Nov. 16, 2023

(30) Foreign Application Priority Data

May 16, 2022 (JP) .................... 2022-080119

(51) Int. Cl.
*G06F 11/32* (2006.01)
*G06T 7/00* (2017.01)

(52) U.S. Cl.
CPC .......... *G06F 11/321* (2013.01); *G06T 7/0002* (2013.01)

(58) Field of Classification Search
CPC ............... G06F 11/321; G06T 7/0002; G01N 35/00722; G01N 2035/0091; H04N 7/18; H04N 23/66
USPC .......................................................... 714/46
See application file for complete search history.

(56) References Cited

U.S. PATENT DOCUMENTS

| 2006/0068712 A1* | 3/2006 | Kroboth | H04W 24/08 455/67.11 |
| 2013/0269411 A1* | 10/2013 | Selman | G01N 33/0006 95/266 |
| 2015/0095717 A1* | 4/2015 | Frenz | G06F 11/2294 714/46 |
| 2017/0091968 A1* | 3/2017 | George | G06T 11/206 |

FOREIGN PATENT DOCUMENTS

JP 2016541036 12/2016

* cited by examiner

*Primary Examiner* — Yair Leibovich
(74) *Attorney, Agent, or Firm* — JCIPRNET

(57) ABSTRACT

A monitoring system includes: an analysis device; a controller that controls the analysis device; and a monitoring device. The monitoring device is capable of communicating with the controller and monitors an operation status of the analysis device. The monitoring device obtains, from the controller, monitoring data including an analysis state and analysis data of the analysis device. In response to a request command from a request origin, the monitoring device generates display data using the monitoring data, and transmits the generated display data to a terminal device of the request origin. The request command includes identification information of the request origin. The monitoring device changes the display data in accordance with the identification information.

9 Claims, 6 Drawing Sheets

FIG.2

| DEVICE NAME | COMMENT | ANALYSIS STATE | ANALYSIS DATA |
|---|---|---|---|
| ANALYSIS No. 0001<br>ANALYSIS DEVICE 1(LC-MS)<br>REQUESTING ENTITY: COMPANY C<br>STATE: ANALYSIS IN PROGRESS | | TEMPERATURE<br>PRESSURE | P1:AAA.AA<br>P2:BBB.BB<br>: : |
| ANALYSIS No. 0002<br>ANALYSIS DEVICE 2 (TENSILE TESTER)<br>REQUESTING ENTITY: COMPANY D<br>STATE: ANALYSIS FINISHED | | TEMPERATURE<br>PRESSURE | P1:CCC.CC<br>P2:DDD.DD<br>: : |
| ANALYSIS No. 0003<br>ANALYSIS DEVICE 3(GC)<br>REQUESTING ENTITY: COMPANY E<br>STATE: IN PREPARATION | | TEMPERATURE<br>PRESSURE<br>USED COLUMN No. | P1:<br>P2:<br>: : |
| ANALYSIS No. 0004<br>ANALYSIS DEVICE 4(EPMA)<br>REQUESTING ENTITY: COMPANY F<br>STATE: STANDBY | | TEMPERATURE<br>PRESSURE | P1:<br>P2:<br>: : |

FIG.3

| DEVICE NAME | COMMENT | ANALYSIS STATE | ANALYSIS DATA |
|---|---|---|---|
| ANALYSIS No. 0002<br>ANALYSIS DEVICE 2 (TENSILE TESTER)<br>REQUESTING ENTITY: COMPANY D<br>STATE: ANALYSIS FINISHED | SOFTWARE IMAGE | TEMPERATURE<br>PRESSURE | P1:CCC.CC<br>P2:DDD.DD<br>: |
| | CAMERA IMAGE | | MEASURED-VALUE LIST |

FIG. 4

| DEVICE NAME | COMMENT | ANALYSIS STATE | ANALYSIS DATA |
|---|---|---|---|
| ANALYSIS No. 0002<br>ANALYSIS DEVICE 2 (TENSILE TESTER)<br>REQUESTING ENTITY: COMPANY D<br>STATE: ANALYSIS FINISHED | | TEMPERATURE<br>PRESSURE | P1:CCC.CC<br>P2:DDD.DD |
| SOFTWARE IMAGE | CAMERA IMAGE | | MEASURED-VALUE LIST |

|  | NORMAL ACCOUNT | ONE-DAY ACCOUNT |
|---|---|---|
| PERIOD OF USE | WITHIN LICENSE CONTRACT PERIOD (ex. 1 YEAR/5 YEARS) | ONE DAY (5 ACCOUNTS/ DAY AT MAXIMUM) |
| VIEWING RESTRICTION | NOT RESTRICTED | RESTRICTED |

MONITORING SYSTEM, MONITORING METHOD AND SERVER USED THEREFOR

CROSS REFERENCE TO RELATED APPLICATIONS

This nonprovisional application is based on Japanese Patent Application No. 2022-080119 filed on May 16, 2022 with the Japan Patent Office, the entire contents of which are hereby incorporated by reference.

BACKGROUND

1. Technical Field

The present disclosure relates to a monitoring system, a monitoring method and a server used therefor, more particularly, to a technique for remotely monitoring an operation status of an analysis device.

2. Related Art

Japanese National Patent Publication No. 2016-541036 discloses a system that performs monitoring with information about a test in a testing device such as a material tester being displayed on a display of a remote computing device such as a smartphone.

SUMMARY

The monitoring system disclosed in Japanese National Patent Publication No. 2016-541036 basically has a configuration in which a user owning and managing the testing device accesses the testing device or a server platform from the computing device to check, on the computing device, operation status and test result of the monitored testing device.

Generally, in the case of the user owning the analysis device including the testing device described above, the same user operates as an analysis-conducting entity and an analysis-result analyzing entity. However, as one of business models, there is the following business model: a user owning an analysis device including a testing device conducts an analysis with regard to a sample in response to a request from a requesting entity for an analysis of the sample, and reports an obtained analysis result to the requesting entity. In this case, the requesting entity is unable to know status of progress, operation environment, analysis condition of the requested analysis operation, and the like until the analysis result is reported from the user. Therefore, for example, in a case where the analysis needs to be conducted again, such as a case where the condition of conducting the analysis operation is inadequate or a case where the analysis result is greatly deviated from an expected result, the analysis may be conducted again at a later timing. Further, when the requesting entity desires to check the operation environment of the analysis operation, the requesting entity needs to visit an actual installation location of the analysis device. Therefore, the requesting entity for the analysis has a need to monitor the requested analysis operation remotely in real time.

To address such a need, the analysis device can be remotely monitored in the following manner: the monitoring system disclosed in Japanese National Patent Publication No. 2016-541036 is made usable to the requesting entity for the analysis. However, since the user owning the analysis device normally often accepts requests for analysis operations from many requesting entities, information about an analysis operation requested from a requesting entity may be leaked to a specific entity when the monitoring system is permitted to be used by the specific entity.

The present disclosure has been made to solve the above-described problem, and has an object to allow a requesting entity for an analysis operation to view a status of the analysis operation while maintaining security in a monitoring system for an analysis device.

A monitoring system according to a first aspect of the present disclosure includes: an analysis device; a controller that controls the analysis device; and a monitoring device. The monitoring device is capable of communicating with the controller and monitors an operation status of the analysis device. The monitoring device obtains, from the controller, monitoring data including an analysis state and analysis data of the analysis device. In response to a request command from a request origin, the monitoring device generates display data using the monitoring data, and transmits the generated display data to a terminal device of the request origin. The request command includes identification information of the request origin. The monitoring device changes the display data in accordance with the identification information.

A server according to a second aspect of the present disclosure is directed to a server that manages data for monitoring an analysis device. The server includes: a processor; and a memory that stores a program to be executed by the processor. By executing the program, the processor is configured to: obtain monitoring data including an analysis state and analysis data of the analysis device; and in response to a request command from a request origin, generate display data using the monitoring data, and transmit the generated display data to a terminal device of the request origin. The request command includes identification information of the request origin. The processor is configured to change the display data in accordance with the identification information.

A method according to a third aspect of the present disclosure is directed to a method of monitoring an analysis device. The method includes: obtaining monitoring data including an analysis state and analysis data of the analysis device; in response to a request command from a request origin, generating display data using the monitoring data; and transmitting the display data to a terminal device of the request origin. The request command includes identification information of the request origin. The generating includes changing the display data in accordance with the identification information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing a first exemplary display screen.

FIG. 3 is a diagram showing a second exemplary display screen.

FIG. 4 is a diagram showing a third exemplary display screen.

DESCRIPTION OF THE PREFERRED EMBODIMENTS

Figure 1:
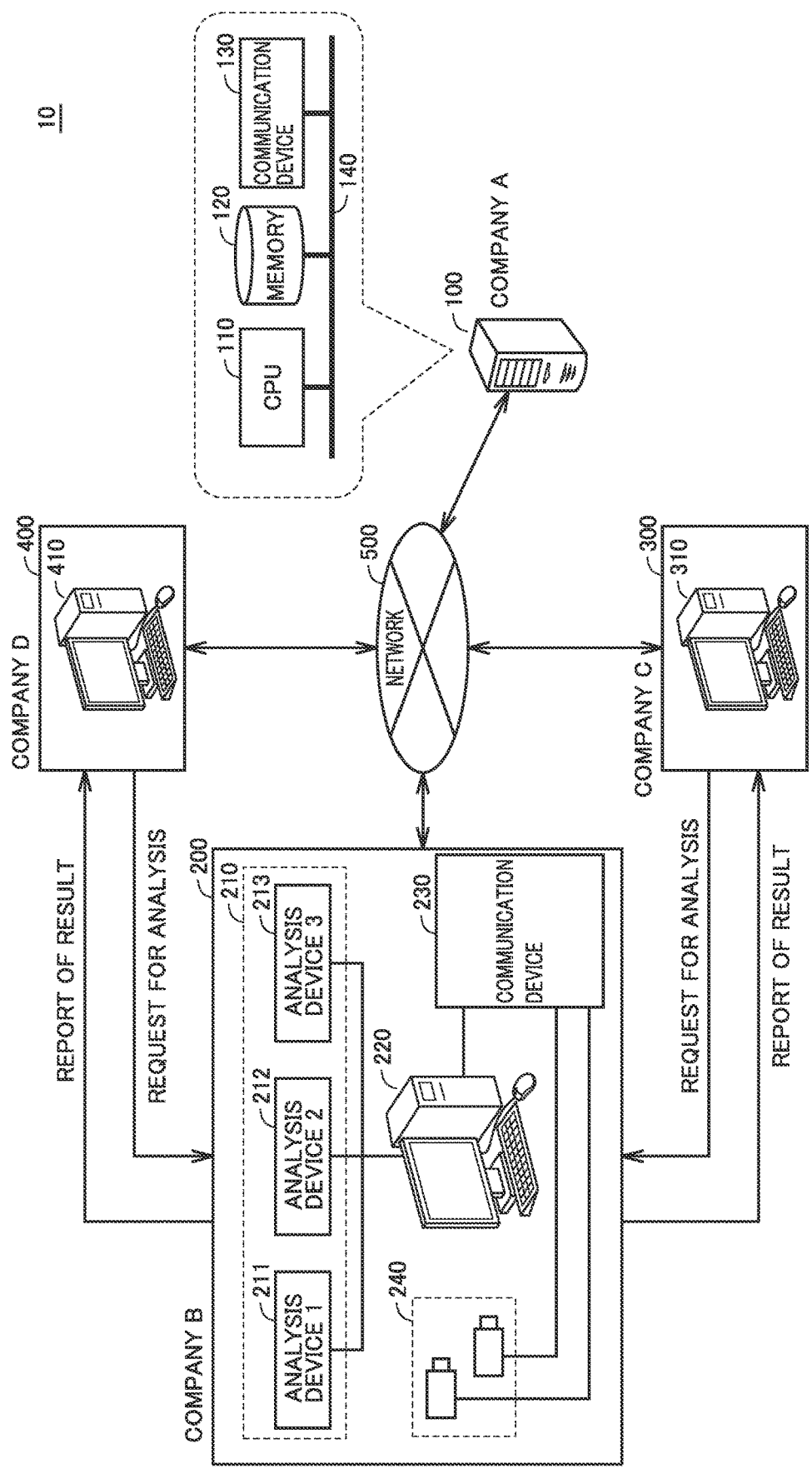
FIG. 1 is an overall schematic diagram of a monitoring system according to an embodiment.

Hereinafter, embodiments of the present disclosure will be described in detail with reference to figures. It should be noted that in the figures, the same or corresponding portions are denoted by the same reference characters and will not be described repeatedly.

[Overview of Monitoring System]

FIG. 1 is an overall schematic diagram of a monitoring system 10 according to an embodiment. Referring to FIG. 1, monitoring system 10 includes a monitoring server 100, analysis devices 211 to 213, a controller 220, a communication device 230, an image capturing device 240, and terminal devices 310, 410. It should be noted that in the following description, analysis devices 211 to 213 are also collectively referred to as "analysis device 210".

Monitoring server 100 is, for example, a cloud server managed by a business entity that is specialized in monitoring business or by a business entity (company A) that provides the analysis device. Analysis device 210, controller 220, communication device 230, and image capturing device 240 are placed in an analytical business entity 200 (company B) that performs analysis operations. Terminal devices 310, 410 are information devices, such as general-purpose computers or mobile terminals, owned by an analysis-requesting entity 300 (company C) and an analysis-requesting entity 400 (company D) that each request an analysis operation to analytical business entity 200. It should be noted that monitoring server 100 may be owned by analytical business entity 200.

When a request for an analysis of a specific material or sample is received from each of analysis-requesting entities 300, 400, analytical business entity 200 analyzes the material or sample using analysis device 210, and reports an analysis result to each of analysis-requesting entities 300, 400 each serving as a request origin.

Monitoring server 100 and the devices owned by analytical business entity 200 and analysis-requesting entities 300, 400 are connected to a communication network 500 such as the Internet, and can communicate together. The communication with communication network 500 may be performed in a wired or wireless manner.

Generally, company A owning monitoring server 100 provides a viewing service for the analysis device in the following manner: information (hereinafter also referred to as "monitoring data") indicating an analysis status provided from analytical business entity 200 is obtained using monitoring server 100, and information included in the monitoring data is provided to a request origin in response to a request from each of a staff in analytical business entity 200 and analysis-requesting entities 300, 400. With such a configuration, each of a supervisor and an operator in analytical business entity 200 as well as analysis-requesting entities 300, 400 can check a current status of progress of the analysis in real time by viewing, as required, the monitoring data stored in monitoring server 100.

Next, each device included in monitoring system 10 will be described in detail. Monitoring server 100 includes a processor 110, a memory 120, and a communication device 130. Processor 110, memory 120, and communication device 130 are connected together by a common bus 140, and can exchange information among them.

Processor 110 is, for example, a CPU (Central Processing Unit), and performs a predetermined calculation process described in a program. Memory 120 includes a ROM (Read Only Memory) and a RAM (Random Access Memory). The ROM stores a program to be executed by processor 110. The RAM temporarily stores: data generated by processor 110 executing a program; and data received through communication device 130. The RAM also functions as a temporary data memory used as a working area.

Communication device 130 is a communication interface for exchanging data between analytical business entity 200 and the device of each of analysis-requesting entities 300, 400 via communication network 500. As described above, the communication between monitoring server 100 and communication network 500 is performed in a wired or wireless manner.

At least one analysis device is placed in analytical business entity 200. Here, the "analysis device" in the present specification is defined to include: an analysis device that analyzes a composition of each of a sample and a material; a testing device that conducts a test with regard to mechanical and chemical properties of each of a sample and a material; and a detection device and an inspection device that each detect a state of a target object.

Examples of analysis device 210 include a chromatograph, a mass spectrometer, a spectrophotometer, a surface analyzer, MALDI (Matrix Assisted Laser Desorption/Ionization), a material tester, a non-destructive inspection device, a medical inspection device, and the like. More specifically, the chromatograph includes gas chromatograph (GC), liquid chromatograph (LC), and the like. The mass spectrometer includes a gas chromatograph mass spectrometer (GC-MS), a liquid chromatograph mass spectrometer (LC-MS), and the like. The spectrophotometer includes a fluorescence spectrophotometer (RF), a Fourier transform infrared spectrophotometer (FT-IR), an ultraviolet-visible near-infrared spectrophotometer, and the like. The surface analyzer includes an electron beam probe microanalyzer (EPMA), an X-ray photoelectron spectrometer (XPS), a fluorescent X-ray analyzer, an X-ray diffractometer (XRD), an atomic absorption spectrophotometer, and the like. The material tester include a tensile tester, a fatigue tester, a hardness tester, an ultrasonic flaw detection tester, and the like. The non-destructive inspection device includes an X-ray inspection device and the like. The medical inspection device includes an X-ray imaging system, a PET inspection device, a PCR inspection device, and the like.

It should be noted that FIG. 1 shows an exemplary configuration in which three analysis devices 211 to 213 are placed; however, the number of the analysis devices is not limited thereto and at least one analysis device may be placed. Each of analysis devices 211 to 213 is connected to controller 220.

Controller 220 is a device that performs overall control over analysis devices 211 to 213. Controller 220 is constituted of, for example, a general-purpose computer, and includes: an input unit such as a keyboard or a touch panel; and a display unit such as a display. Controller 220 manages schedules of analysis operations in each analysis device, and performs the analysis operations in each analysis device automatically. Further, controller 220 obtains data of analysis conditions (temperature, pressure, and the like) obtained from various types of sensors attached to analysis devices 211 to 213, and obtains and stores analysis data obtained through an analysis. Software for analyzing the obtained analysis data is incorporated in controller 220, and the analysis data can be edited in the form of a table or a graph can be generated.

Image capturing device 240 includes a plurality of cameras. The plurality of cameras are placed in a room in which analysis device 210 is placed, and are placed for each analysis device. Image capturing device 240 captures video images for a state of an analysis environment, a state of the analysis device, a state of an operation by an analysis operator, and the like.

Communication device 230 is a communication interface for exchanging data with monitoring server 100 via communication network 500. Controller 220 and the cameras included in image capturing device 240 are connected to communication device 230. Communication device 230 transmits, to monitoring server 100 via communication network 500, the monitoring data transmitted from controller 220, and image data obtained from image capturing device 240 or data obtained by extracting information from the image data and quantifying it.

Further, communication device 230 obtains display data transmitted from monitoring server 100 in response to a request from controller 220 and/or a terminal device (not shown) in analytical business entity 200, and outputs the display data to controller 220 or the terminal device. In each of controller 220 and the terminal device, the display data transmitted from monitoring server 100 is displayed on the display unit such as the display. With such a configuration, the analysis operator and the supervisor in analytical business entity 200 can remotely monitor analysis information in analysis device 210.

As described above, each of terminal devices 310, 410 in analysis-requesting entities 300, 400 is a communication device capable of accessing communication network 500, such as a general-purpose computer or a mobile terminal device such as a smartphone or a tablet. As described below, when monitoring server 100 receives a request command from each of terminal devices 310, 410, monitoring server 100 generates the display data by associating the monitoring data stored in memory 120 with the video data based on a time, and outputs the display data to the terminal device having transmitted the request command. The display data obtained from monitoring server 100 is displayed on the display unit of each of terminal devices 310, 410. With such a configuration, the status of progress of the analysis, the analysis result, and the like in analytical business entity 200 can be also checked in each of analysis-requesting entities 300, 400.

An example of displaying the display data transmitted from monitoring server 100 will be described with reference to FIGS. 2 to 4. It should be noted that in FIGS. 2 to 4, examples of a display screen displayed on controller 220 of analytical business entity 200 or on a terminal device held by a staff of analytical business entity 200 will be described.

FIG. 2 shows an exemplary display screen of a list of analysis devices. In the example of FIG. 2, pieces of information about four analysis devices are displayed, and "DEVICE NAME", "COMMENT", "ANALYSIS STATE" and "ANALYSIS DATA" for each analysis device are displayed.

In the column "DEVICE NAME", a reference number (ANALYSIS No.) for an analysis operation, name and type of an analysis device, a name of an analysis-requesting entity, a current status, and the like are displayed. In the example of FIG. 2, an "analysis device 1" is a liquid chromatograph mass spectrometer (LC-MS), an "analysis device 2" is a tensile tester, an "analysis device 3" is a gas chromatograph (GC), and an "analysis device 4" is an electron beam probe analyzer (EPMA). In the column "COMMENT", for example, a name of an analyzed sample, a caution in the analysis, and/or a reported matter from an analysis operator after the analysis are displayed.

In the column "ANALYSIS STATE", the current state of the analysis device and an analysis condition set for the analysis are displayed. The analysis condition includes a temperature, a pressure, a load, a concentration, a speed, an exposure time, and the like. Types of a reagent, a column, a mobile phase, and the like to be used for the analysis or actually used for the analysis are also displayed.

In the column "ANALYSIS DATA", a current value, representative value, or the like of the analysis data actually obtained by the analysis is displayed.

When a specific analysis device is selected in the displayed list of FIG. 2, detailed information about the selected analysis device is displayed as shown in FIGS. 3 and 4. Each of FIGS. 3 and 4 shows an exemplary display screen when "analysis device 2" in FIG. 2 is selected. In the upper part of the display screen of each of FIGS. 3 and 4, the same information as that in FIG. 2 is displayed, whereas in the lower part thereof, the detailed information is displayed.

As the detailed information, an image of the analysis data processed by the software in controller 220 can be displayed as shown in FIG. 3. Alternatively, a current camera image or a camera image during the analysis can be displayed as shown in FIG. 4. As shown in FIG. 4, analysis device 2 is a tensile tester. It should be noted that although not shown in the figures, raw data of measured values can be displayed in the form of a list.

Thus, in analytical business entity 200, various types of information about all the analysis devices owned by analytical business entity 200 can be obtained from monitoring server 100 and can be viewed. Accordingly, the progress of the analysis operation and the analysis result can be managed.

[As to Type of Contract and Viewing Restriction]

Figures 5, 6:
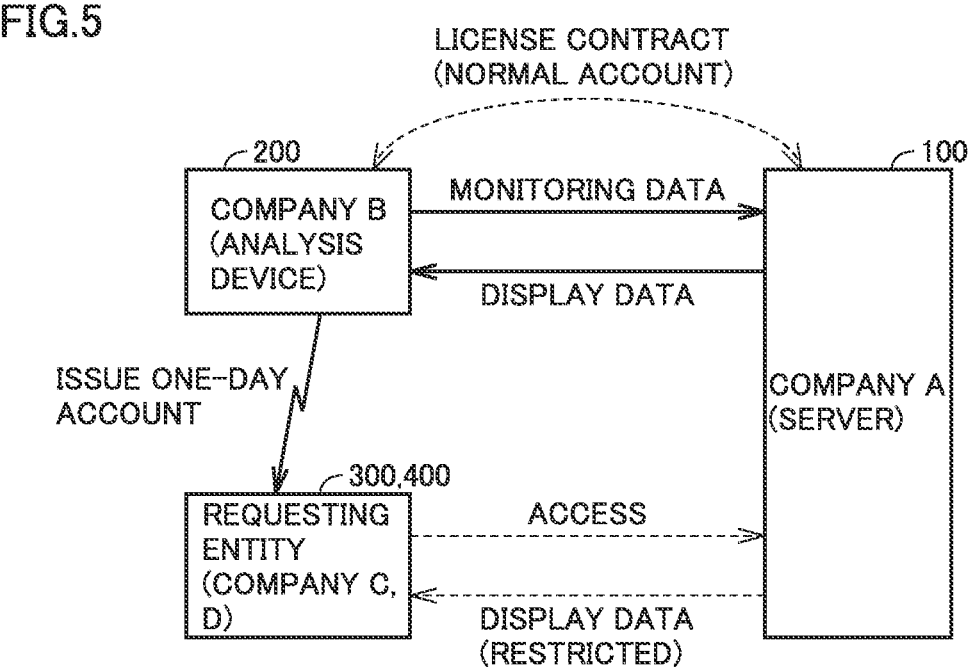
FIG. 5 is a diagram for illustrating a license contract for an account.
FIG. 6 is a diagram for illustrating contents of each account.

Next, referring to FIGS. 5 and 6, the following describes a type of a contract as to a viewing service for an analysis status as provided by monitoring system 10. FIG. 5 is a diagram for illustrating a license contract for an account. FIG. 6 is a diagram for illustrating contents of each account.

As described above, monitoring server 100 is owned by company A, and the viewing service is provided by company A. Company B, which is analytical business entity 200, concludes a license contract with company A and pays a predetermined usage fee, thereby obtaining an account for using the viewing service. The account issued through the license contract is a "normal account". As shown in FIG. 6, with the normal account, company B can view monitoring data and image data for company B stored in monitoring server 100 without restriction during a period of contract (for example, one year, five years, or the like). For one normal account, five users are permitted to be used, for example.

Further, company B can issue a provisional account by which the viewing service can be temporarily used by a third party not having concluded a license contract with company A, such as each of company C and company D that are the analysis-requesting entities. The use period of this provisional account is, for example, one day, and in this case, the provisional account is also referred to as "one-day account". The one-day account is issued by company A (monitoring server 100) in response to a request from company B having the normal account.

Each of the normal account and one-day account issued by company A includes identification information (ID information) and password information. The user can access monitoring server 100 by using the ID information and the password. The ID information and the password differ for each account, and monitoring server 100 can specify the user having accessed the server by using the ID information and the password.

Then, monitoring server 100 restricts a viewable range for the user having the one-day account so as to allow the user having the one-day account to view only information associated with the analysis operation requested by the user having the one-day account. Specifically, when the one-day account is given to company C, company C can view only information associated with the analysis operation for company C, but cannot view information associated with the analysis operation for company D. Similarly, when the one-day account is given to company D, company D can view only the information associated with the analysis operation for company D, but cannot view the information associated with the analysis operation for company C.

Thus, by using the provisional account such as the one-day account, even the user having no license contract can electronically and remotely view the information of the analysis operation requested by the user having no license contract. Further, by restricting the viewable range for the access with the one-day account, information associated with other users can be prevented from being leaked.

It should be noted that the issuing of the one-day account may fall within the scope of the contract for the normal account, or may be an optional contract requiring an additional fee. Further, the number of one-day accounts issued for one day may be restricted to, for example, five. In this case, a request for issuing six or more one-day accounts may be made by paying an additional fee. Although the present example has been described based on the one-day account, the validity period of the temporary account such as the one-day account is not limited to one day, and the temporary account may be an account that gives a privilege for viewing in a period longer than one day. Further, in the present example, it has been illustratively described that company B gives the one-day account to each of company C and company D; however, for example, company A may give the one-day account directly to company C based on such information that company C has requested an analysis to company B.

By using the type of contract that is based on the account as described above, the viewing service in the present embodiment can be provided. Moreover, company A can make a profit by providing the viewing service, and can address such a need of the analysis-requesting entity that the status of progress of the analysis can be checked remotely in real time, while maintaining the security. Further, since the analysis-requesting entity can check the analysis result at an early time, a measure can be promptly taken when the analysis needs to be performed again with the analysis condition being changed or when additional matters need to be analyzed.

[Details of Control in Each Device]

Figure 7:
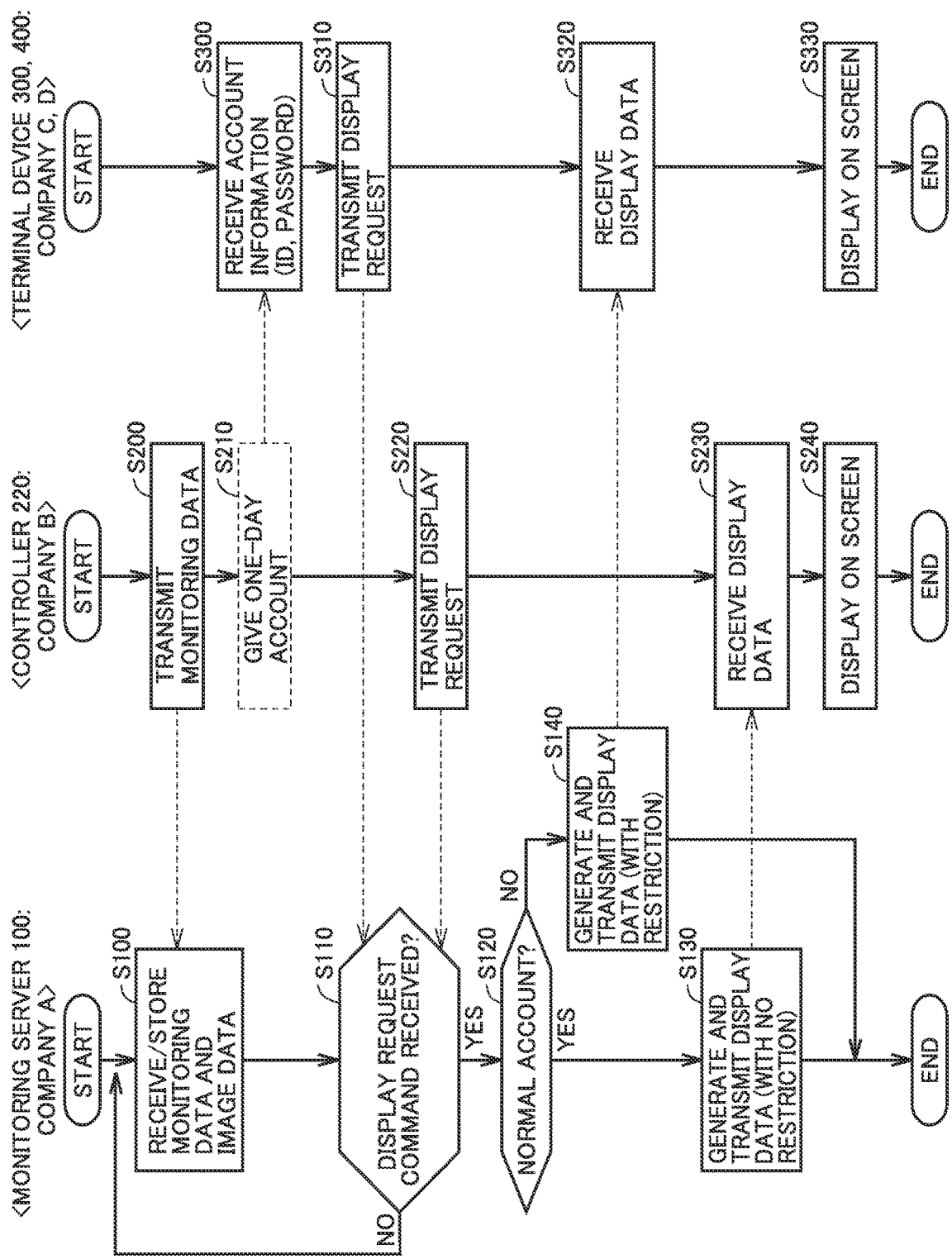
FIG. 7 is a diagram for illustrating details of control performed in each device of the monitoring system.

Next, referring to FIG. 7, the following describes details of control performed in each of monitoring server 100, controller 220 of analytical business entity 200, and terminal devices 310, 410 in analysis-requesting entities 300, 400. FIG. 7 shows a flowchart of processes performed in monitoring server 100, controller 220, and terminal devices 310, 410.

(Process of Monitoring Server)

First, the process for monitoring server 100 will be described. In a step (hereinafter, the term "step" is abbreviated as "S") 100, monitoring server 100 receives, via communication network 500, monitoring data and image data transmitted from controller 220 of analytical business entity 200, and stores the received data into memory 120.

Next, in S110, monitoring server 100 determines whether or not a display request command is received from controller 220 or each of terminal devices 310, 410 of analysis-requesting entities 300, 400. When the display request command is not received (NO in S110), the process is returned to S100, and monitoring server 100 waits for reception of the display request command while continuously receiving the monitoring data and the image data from controller 220 and storing them.

When the display request command is received (YES in S110), the process proceeds to S120, and monitoring server 100 determines, based on ID information included in the display request command, whether the display request command is transmitted from analytical business entity 200 having concluded the normal account contract or is transmitted from each of analysis-requesting entities 300, 400 having been given the one-day account.

When the display request command is transmitted from analytical business entity 200 (YES in S120), the process proceeds to S130, and monitoring server 100 generates display data in accordance with the display request command and transmits the display data to controller 220 without making a viewing restriction. It should be noted that the viewing restriction may be made even on a staff of analytical business entity 200 in accordance with an affiliation, job title, or the like of the requester.

On the other hand, when the display request command is transmitted from each of analysis-requesting entities 300, 400 (NO in S120), the process proceeds to S140, and monitoring server 100 generates display data with a displayable range being restricted, and transmits the generated display data to the terminal device of the request origin. Here, in the display data generated in S140, the viewable range is restricted so as to include only information associated with the analysis requested by the analysis-requesting entity serving as the request origin and so as not to include information associated with an analysis requested by another analysis-requesting entity. Also, data used only within analytical business entity 200 is restricted so as not to be displayed.

Thus, by restricting the viewable range based on the ID information, information associated with a certain analysis-requesting entity can be prevented from being leaked to another analysis-requesting entity.

(Process in Analytical Business Entity)

Next, the process in controller 220 of analytical business entity 200 will be described.

When the monitoring data from analysis device 210 is obtained, controller 220 transmits the obtained monitoring data to monitoring server 100 via communication device 230 and communication network 500 in S200. It should be noted that on this occasion, the image data from image capturing device 24 is also transmitted from communication device 230.

Next, in S210, controller 220 gives a one-day account to each of analysis-requesting entities 300, 400 in response to a request. The one-day account includes ID information and information of password. The ID information and password of the one-day account are issued by monitoring server 100. It should be noted that the information of the one-day account does not need to be systematically conveyed between controller 220 and each of terminal devices 310, 410, and may be conveyed orally or by a written form from a representative person of analytical business entity 200 to a representative person of each of analysis-requesting entities 300, 400.

Next, in S220, based on an instruction from a staff of analytical business entity 200, controller 220 accesses monitoring server 100 and transmits a display request command. The display request command includes the ID information and information of password for the normal account that analytical business entity 200 has.

Then, controller 220 receives the display data transmitted from monitoring server 100 in response to the display request command (S230), and displays the received data on the display unit of controller 220 (S240).

It should be noted that the process in controller 220 has been described above; however, the processes in S220 to S240 can be applied to another terminal device in analytical business entity 200.

(Process in Analysis-Requesting Entity)

Next, the process in each of terminal devices 310, 410 of analysis-requesting entities 300, 400 will be described.

In S300, each of terminal devices 310, 410 obtains the account information (ID information and password) of the one-day account from controller 220 of analytical business entity 200. Then, in S310, each of terminal devices 310, 410 accesses monitoring server 100 using the obtained ID information and password based on an instruction from a staff of each of analysis-requesting entities 300, 400, and transmits a display request command.

Then, each of terminal devices 310, 410 receives display data transmitted from monitoring server 100 in response to the display request command (S320), and displays the received data on the display unit of each of terminal devices 310, 410 (S330).

By controlling the devices in accordance with the above-described processes, even an analysis-requesting entity having no license contract with the business entity owning the monitoring server can view an analysis state in the analytical business entity with a displayable period and a displayable range being restricted. By restricting the displayable range to the information associated with the analysis-requesting entity that is the request origin, the information associated with the analysis-requesting entity can be prevented from being leaked to another analysis-requesting entity. Therefore, the status of the analysis operation can be remotely viewed by the requesting entity for the analysis operation while maintaining security.

It should be noted that "monitoring server 100" in the present embodiment corresponds to a "monitoring device" in the present disclosure. "Analytical business entity 200" in the present embodiment corresponds to a "first requester" in the present disclosure. "Analysis-requesting entity 300" and "analysis-requesting entity 400" in the present embodiment respectively correspond to a "second requester" and a "third requester" in the present disclosure.

[Implementations]

(Item 1) A monitoring system according to one implementation includes: an analysis device; a controller that controls the analysis device; and a monitoring device. The monitoring device is capable of communicating with the controller and monitors an operation status of the analysis device. The monitoring device obtains, from the controller, monitoring data including an analysis state and analysis data of the analysis device. In response to a request command from a request origin, the monitoring device generates display data using the monitoring data, and transmits the generated display data to a terminal device of the request origin. The request command includes identification information of the request origin. The monitoring device changes the display data in accordance with the identification information.

According to the monitoring system according to item 1, the monitoring device can change, in accordance with the identification information included in the request command from the request origin (analysis-requesting entity), the display data indicating the analysis status and to be transmitted to the request origin. Thus, the display data corresponding to the analysis-requesting entity that is the request origin can be selectively transmitted, thereby preventing leakage of information associated with other requesting entities. Therefore, in the monitoring system for the analysis device, the requesting entity for the analysis operation can view the status of the analysis operation while maintaining the security.

(Item 2) The monitoring system according to item 1 further includes a camera that captures an image of the analysis device. The monitoring device obtains image data from the camera. The display data includes the image data.

According to the monitoring system according to item 2, the status of the analysis device during the analysis can be checked as the image data.

(Item 3) In the monitoring system according to item 1 or 2, the request origin includes a first requester and a second requester, the first requester having first identification information, the second requester having second identification information temporarily issued from the first requester. The monitoring device restricts a content of the display data to be transmitted in response to the second identification information, as compared with a content of the display data to be transmitted in response to the first identification information.

According to the monitoring system according to item 3, the requester temporarily permitted to view is restricted in terms of a viewable range as compared with the requester having the normal identification information.

(Item 4) In the monitoring system according to item 3, a validity period of the second identification information is one day.

According to the monitoring system according to item 4, a viewing period for the requester temporarily permitted to view can be restricted to one day.

(Item 5) In the monitoring system according to item 3 or 4, the second identification information temporarily issued is issued by the monitoring device based on a request from the first requester. The monitoring device restricts the number of pieces of the identification information temporarily issued for one day to a predetermined number or less.

According to the monitoring system according to item 5, the number of requesters temporarily permitted to view can be restricted.

(Item 6) In the monitoring system according to any one of items 3 to 5, the first requester is an analytical business entity that conducts an analysis using the analysis device. The second requester is an analysis-requesting entity that requests the analysis to the analytical business entity.

According to the monitoring system according to item 6, the viewable range for the analysis-requesting entity can be restricted without restricting the viewable range for the analytical business entity that conducts the analysis.

(Item 7) In the monitoring system according to item 3, the request origin further includes a third requester having third identification information temporarily issued from the first requester. When the second identification information is received, the monitoring device transmits the display data to the second requester with information associated with the second requester being included in the display data, and prohibits transmission of information associated with the third requester. When the third identification information is received, the monitoring device transmits the display data to the third requester with the information associated with the third requester being included in the display data, and prohibits transmission of the information associated with the second requester.

According to the monitoring system according to item 7, the requester temporarily permitted to view can be prohibited from viewing the information associated with the other requester. Thus, information of a different requester can be prevented from being leaked.

(Item 8) In the monitoring system according to item 7, the first requester is an analytical business entity that conducts an analysis using the analysis device. Each of the second requester and the third requester is an analysis-requesting entity that requests the analysis to the analytical business entity.

According to the monitoring system according to item 8, the viewable range for the analysis-requesting entity can be restricted without restricting the viewable range for the analytical business entity that conducts the analysis.

(Item 9) A server according to one implementation is directed to a server that manages data for monitoring an analysis device. The server includes: a processor; and a memory that stores a program to be executed by the processor. By executing the program, the processor is configured to: obtain monitoring data including an analysis state and analysis data of the analysis device; and in response to a request command from a request origin, generate display data using the monitoring data, and transmit the generated display data to a terminal device of the request origin. The request command includes identification information of the request origin. The processor is configured to change the display data in accordance with the identification information.

(Item 10) A method according to one implementation is directed to a method of monitoring an analysis device. The method includes: obtaining monitoring data including an analysis state and analysis data of the analysis device; in response to a request command from a request origin, generating display data using the monitoring data; and transmitting the display data to a terminal device of the request origin. The request command includes identification information of the request origin. The generating includes changing the display data in accordance with the identification information.

According to each of the server according to item 9 and the method according to item 10, the requesting entity for the analysis operation can view the status of the analysis operation while maintaining security.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A monitoring system comprising:
a first analysis device and a second analysis device;
a controller that controls the first and second analysis devices; and
a server that communicates with the controller and that monitors an operation status of each of the first and second analysis devices, wherein
the server is configured to obtain, from the controller, monitoring data including an analysis state and analysis data of each of the first and second analysis devices,
a request origin includes a first requester and a second requester,
an analysis requested by the first requester is implemented by the first analysis device, and an analysis requested by the second requester is implemented by the second analysis device,
the server is configured to
receive, from the first and second requesters, a request command including respective identification information,
identify the request origin from the received identification information,
when the identified request origin is the first requester, generate display data using the monitoring data from the first analysis device, and transmit the generated display data to a terminal device of the first requester, and
restrict a content of the display data to be transmitted, in accordance with the received identification information.

2. The monitoring system according to claim 1, further comprising a camera that captures an image of the analysis device, wherein
the server obtains image data from the camera, and
the display data includes the image data.

3. A monitoring system comprising:
an analysis device;
a controller that controls the analysis device; and
a server that communicates with the controller and that monitors an operation status of the analysis device, wherein
the server obtains, from the controller, monitoring data including an analysis state and analysis data of the analysis device,
in response to a request command from a request origin, the server generates display data using the monitoring data, and transmits the generated display data to a terminal device of the request origin,
the request command includes identification information of the request origin, and
the server changes the display data in accordance with the identification information,
wherein the request origin includes a first requester and a second requester, the first requester having first identification information, the second requester having second identification information temporarily issued from the first requester, and
the server restricts a content of the display data to be transmitted in response to the second identification information, as compared with a content of the display data to be transmitted in response to the first identification information.

4. The monitoring system according to claim 3, wherein a validity period of the second identification information is one day.

5. The monitoring system according to claim 3, wherein
the second identification information temporarily issued is issued by the server based on a request from the first requester, and
the server restricts a number of pieces of the identification information temporarily issued for one day to a predetermined number or less.

6. The monitoring system according to claim 3, wherein the first requester is an analytical business entity that conducts an analysis using the analysis device, and the second requester is an analysis-requesting entity that requests the analysis to the analytical business entity.

7. The monitoring system according to claim 3, wherein the request origin further includes a third requester having third identification information temporarily issued from the first requester,
when the second identification information is received, the server transmits the display data to the second requester with information associated with the second requester being included in the display data, and prohibits transmission of information associated with the third requester, and
when the third identification information is received, the server transmits the display data to the third requester with the information associated with the third requester being included in the display data, and prohibits transmission of the information associated with the second requester.

8. The monitoring system according to claim 7, wherein the first requester is an analytical business entity that conducts an analysis using the analysis device, and
each of the second requester and the third requester is an analysis-requesting entity that requests the analysis to the analytical business entity.

9. A method of monitoring a first analysis device and a second analysis device, the method comprising:
obtaining monitoring data including an analysis state and analysis data of the analysis device of each of the first and second analysis devices, a request origin including a first requester and a second requester, an analysis requested by the first requester being implemented by the first analysis device, and an analysis requested by the second requester being implemented by the second analysis device;
receiving, from the first and second requesters, a request command including respective identification information,
identifying the request origin from the received identification information, and
when the identified request origin is the first requester, generating display data using the monitoring data from the first analysis device;
transmitting the generated display data to a terminal device of the first requester, and
restricting a content of the display data to be transmitted, in accordance with the received identification information.

* * * * *